April 14, 1959   A. CAMPO   2,882,380
DESOLDERING TOOL
Filed June 25, 1957
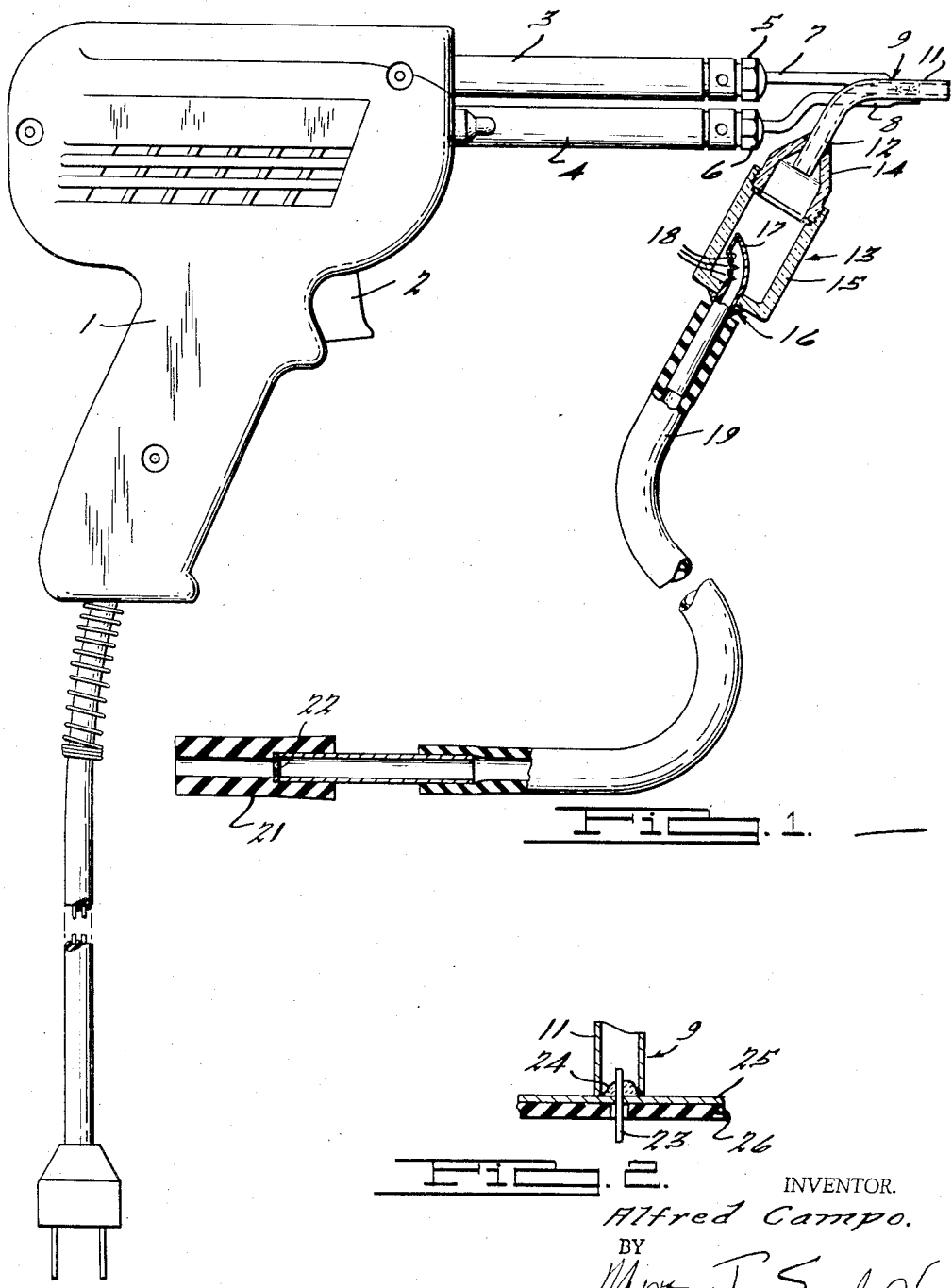
INVENTOR.
Alfred Campo.
BY
Myron J. Seibel
ATTORNEY.

United States Patent Office 2,882,380
Patented Apr. 14, 1959

2,882,380

DESOLDERING TOOL

Alfred Campo, Detroit, Mich.

Application June 25, 1957, Serial No. 667,800

6 Claims. (Cl. 219—26)

This invention relates to a desoldering tool applicable to existing soldering guns and particularly designed for work on television and radio printed circuit boards.

In desoldering component terminals on printed circuit boards, it is difficult not to injure the component or the board, or both, and it is an object of this invention to provide a tool which effects this desoldering without injuring either, and which operates quickly and easily.

Another object of the invention is a desoldering tool having a tubular tip of a size to fit over a printed board terminal to facilitate melting of the solder therearound and removal of the solder from the terminal hole without injuring the terminal or burning the board.

Another object of the invention is a desoldering tool in accordance with the preceding object having provision for sucking the molten solder from the hole between the terminal and board.

Another object of the invention is a desoldering tool in accordance with the preceding objects in which the suction train includes a ceramic chamber or cup in which the solder is caught and solidified.

Other objects and features of the invention will be readily apparent to those skilled in the art from the specification and appended drawing illustrating certain preferred embodiments in which:

Figure 1 is a view partly in elevation and partly in section of a desoldering tool according to the present invention.

Figure 2 is a detail view in section showing the application of the tip of the desoldering tool about a component terminal in desoldering position.

The tool of this invention is illustrated in the drawing, for purpose of explanation, as a conversion kit applied to a standard soldering gun indicated generally at 1 and having a controlling switch trigger 2 and main conducting arms 3 and 4. Arms 3 and 4 have conventional end clamps 5 and 6, respectively, normally holding the removable heating arms of a soldering gun.

The heating arms forming the tip of a soldering gun are removed and substituted therefor are heating arms 7 and 8 at whose juncture is a brazed or integral tube 9 of high heat conductivity material, low mass and an interior bore of a size to fit over the terminal of a board component. The projecting end of tube 9 is straight as at 11 and terminates in a cut at substantially right angles to its axis. The interior end of tube 9 is curved at 12 for clearance and is there cemented, screwed or otherwise mounted in one end of a cup or chamber 13 of porcelain or other ceramic material, the chamber having two sections 14 and 15 with the tube 9 mounted to the section 14. The sections are shown screwed together for easy disassembly.

In the chamber section 15 is cemented or otherwise mounted a tube 16 having a curved interior portion 17 in the protected side of which are a plurality of air openings 18. On the outer end of tube 16 is mounted a flexible tube 19 having in its opposite end a removable tip 21 which may include a filter 22 of cloth or other porous material.

In Figure 2 the tube 9 is shown in desoldering position with its end 11 surrounding a component terminal 23 soldered at 24 to the "printed" conductor 25 on a supporting board 26. It is seen that the end of tube 9 is in contact with the solder 24 surrounding the treminal 23 which melts substantially uniformly and thus avoids burning of the board.

In view of its use in the soldering gun which heats quickly and the desire to apply evenly distributed heat which will not burn the board, the tube 9 is, as stated, preferably of high heat conductivity and low mass and with a bore of a diameter to fit over component terminals on the board.

As the solder 24 melts, suction is applied orally by the operator to the mouthpiece 21, creating a vacuum in the chamber 13 and sucking the solder thereinto where it is collected and quickly cooled.

Due to the interior curvature 17 of the tube 16, the openings 18 are protected from entrance of the molten solder which collects on the wall of chamber section 15 whence it may be easily removed after separation of the chamber sections since the solder will not adhere well to the porcelain or ceramic wall.

The operator is further protected from molten solder by the length of the flexible tube 19 and the filter 22 in the mouthpiece 21.

While the desoldering tool of the invention is particularly adapted for a desoldering operation, it can also obviously be used for soldering in view of the high heat conductivity, low mass and evenly distributed heat of the tube tip without the application of suction; and, while a particular preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. A heating and solder removing suction tip for a desoldering tool comprising a generally U-shaped heating element for a transformer type soldering gun, and a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder and facilitate its removal through the tubular tip, the end of the tip opposite to the terminal receiving end being positioned for attachment to suction applying means.

2. A desoldering tool comprising a generally U-shaped heating element for a transformer type soldering gun, a tubular tip of heat conductive metal and of low mass integrally mounted at the closed extremity of the heating element having an interior diameter of a size to receive a component terminal so that the end of the tip will be presented relatively evenly to the solder about the terminal to effect melting of the solder, and means for applying suction to the tubular tip to remove the melted solder therethrough.

3. A desoldering tool as defined in claim 2 in which said means includes a suction chamber of ceramic material in which the removed solder is collected in readily removable solidified form.

4. A desoldering tool as defined in claim 2 in which said means includes a suction chamber serving also to collect the removed solder, and an oral tube connected to said suction chamber to exhaust air therefrom.

5. A desoldering tool as defined in claim 4 in which said tube includes a portion within the chamber having protected air openings providing for ready exhaust of air while inhibiting exit of solder from the chamber.

6. A desoldering tool as defined in claim 2 in which said means includes a flexible tube connected to said tubular tip and terminating in a mouthpiece providing for oral exhaust of the solder.

References Cited in the file of this patent

UNITED STATES PATENTS

| | | |
|---|---|---|
| 2,184,980 | Smith | Dec. 26, 1939 |
| 2,609,778 | Bleam et al. | Sept. 9, 1952 |
| 2,826,667 | Brillinger | Mar. 11, 1958 |

FOREIGN PATENTS

| | | |
|---|---|---|
| 940,388 | France | May 18, 1948 |